United States Patent
Pendharkar et al.

(10) Patent No.: US 9,953,035 B1
(45) Date of Patent: Apr. 24, 2018

(54) SYSTEMS AND METHODS FOR EFFICIENTLY BACKING UP DATA IN THIN-PROVISIONED ENVIRONMENTS

(75) Inventors: Niranjan Pendharkar, NCL/Pashan (IN); Samir Desai, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 1103 days.

(21) Appl. No.: 12/609,213

(22) Filed: Oct. 30, 2009

(51) Int. Cl.
*G06F 17/30* (2006.01)

(52) U.S. Cl.
CPC .............. *G06F 17/30067* (2013.01)

(58) Field of Classification Search
CPC ........... G06F 11/2097; G06F 17/30194; G06F 9/441; G06F 17/30067
USPC ........................................ 707/654
See application file for complete search history.

(56) References Cited

U.S. PATENT DOCUMENTS

| | | | |
|---|---|---|---|
| 6,763,458 B1* | 7/2004 | Watanabe et al. | 713/100 |
| 7,805,584 B2* | 9/2010 | Shackelford | 711/162 |
| 2004/0002999 A1* | 1/2004 | Rand | 707/104.1 |
| 2007/0186070 A1* | 8/2007 | Federa et al. | 711/163 |
| 2007/0266037 A1* | 11/2007 | Terry et al. | 707/100 |
| 2008/0120459 A1* | 5/2008 | Kaneda et al. | 711/112 |
| 2008/0282047 A1* | 11/2008 | Arakawa et al. | 711/162 |
| 2009/0024752 A1* | 1/2009 | Shitomi | 709/230 |
| 2010/0088485 A1* | 4/2010 | Ikeda et al. | 711/170 |
| 2010/0250880 A1* | 9/2010 | Mimatsu | 711/162 |

OTHER PUBLICATIONS

"IBM XIV Storage System: Thin Provisioning Reinvented", Sep. 2008, IBM.*
Taylor, Matthew; Technical Case Study: Thin Provisioning for Disk-to-Disk Backup; Tech OnTap; http://partners.netapp.com/go/techontap/matl/thin_case_study.html; Feb. 2007.

* cited by examiner

Primary Examiner — Apu Mofiz
Assistant Examiner — Sheryl Holland
(74) Attorney, Agent, or Firm — FisherBroyles LLP

(57) ABSTRACT

An exemplary method for efficiently backing up data in thin-provisioned environments may include: 1) identifying a volume to be backed up, 2) identifying a thin-provisioned storage system that contains storage space allocated to the volume, 3) obtaining information from the thin-provisioned storage system that identifies portions of the volume for which storage space has been allocated on the thin-provisioned storage system, and then 4) creating a backup of the volume by invoking read operations only for those portions of the volume for which storage space has been allocated on the thin-provisioned storage system. Various other methods, systems, and computer-readable media are also disclosed.

18 Claims, 7 Drawing Sheets ical description in conjunction with the accompanying drawings and claims.

SYSTEMS AND METHODS FOR EFFICIENTLY BACKING UP DATA IN THIN-PROVISIONED ENVIRONMENTS

BACKGROUND

Organizations with high volumes of data have long sought to maximize data storage performance while minimizing the cost of storage. Because of this, some organizations have turned to thin-provisioning solutions in an effort to efficiently utilize available storage space. Thin-provisioning solutions typically allocate storage space from a common pool to computing systems on an as-needed or just-in-time basis in an effort to prevent storage space from going to waste.

Unfortunately, while thin-provisioning solutions may reduce storage requirements by allocating storage on an as-needed basis, many conventional backup systems fail to take advantage of the efficiencies provided by these thin-provisioning solutions. For example, a conventional backup system may attempt to back up 500 GB of a 500 GB thin-provisioned volume, even if only 20 GB of the volume has been written to and/or allocated storage space by a thin-provisioned storage system. As such, conventional backup systems may unnecessarily negatively impact input/output ("I/O") performance by attempting to read all data from a thin-provisioned volume without regard to those portions of the volume that have been written to and/or allocated storage space. Accordingly, the instant disclosure identifies and addresses a need for systems and methods for efficiently backing up data within a thin-provisioned environment.

SUMMARY

As will be described in greater detail below, the instant disclosure generally relates to systems and methods for efficiently backing up data in thin-provisioned environments. In one example, one or more of the systems described herein may accomplish this task by: 1) identifying a volume to be backed up, 2) identifying a thin-provisioned storage system that contains storage space allocated to the volume, 3) obtaining information from the thin-provisioned storage system that identifies portions of the volume for which storage space has been allocated on the thin-provisioned storage system, and then 4) creating a backup of the volume by invoking read operations only for those portions of the volume for which storage space has been allocated on the thin-provisioned storage system.

In some examples, the volume may represent a portion of a volume, an entire volume, a plurality of volumes, and/or at least a portion of a file system. In one example, identifying the thin-provisioned storage system may include using a storage-mapping service to identify logical unit numbers (LUNs) of the thin-provisioned storage system that contain storage space allocated to the volume.

In some embodiments, obtaining the information from the thin-provisioned storage system may include obtaining the information: 1) via a file system associated with the volume, 2) via a volume manager associated with the volume, and/or 3) directly from the thin-provisioned storage system. In addition, obtaining the information from the thin-provisioned storage system may include obtaining the information via an API associated with the thin-provisioned storage system.

In one example, invoking read operations only for those portions of the volume for which storage space has been allocated on the thin-provisioned storage system may include reading only those portions of the volume for which storage space has been allocated on the thin-provisioned storage system from a file system associated with the volume, a volume manager associated with the volume, and/or the thin-provisioned storage system.

In some examples, obtaining the information from the thin-provisioned storage system may include obtaining an allocation map from the thin-provisioned storage system that identifies: 1) the portions of the volume for which storage space has been allocated on the thin-provisioned storage system, 2) portions of the volume for which storage space has not been allocated on the thin-provisioned storage system, and/or 3) the location of the storage space on the thin-provisioned storage system that has been allocated to the volume. In these examples, creating the backup of the volume may include storing, within the backup of the volume, those portions of the volume for which storage space has been allocated on the thin-provisioned storage system and/or the allocation map. Creating the backup of the volume further may also include writing zeros within the backup of the volume in place of the portions of the volume for which storage space has not been allocated on the thin-provisioned storage system.

In one example, the method may also include, upon creating the backup of the volume, restoring the volume by identifying, within the backup of the volume, the portions of the volume for which storage space has been allocated on the thin-provisioned storage system and then restoring, from the backup of the volume, only those portions of the volume for which storage space has been allocated on the thin-provisioned storage system. In some embodiments, restoring the volume may include restoring the volume to the thin-provisioned storage system and/or a non-thin-provisioned storage system.

In some examples, restoring the volume to the non-thin-provisioned storage system may include identifying, within the backup of the volume, portions of the volume for which storage space has not been allocated on the thin-provisioned storage system and then writing zeros on the non-thin-provisioned storage system in place of the portions of the volume for which storage space has not been allocated on the thin-provisioned storage system. The method may also include, upon restoring the volume, reclaiming unallocated storage space.

As will explained in detail below, by invoking read operations only for those portions of a volume for which storage space has been allocated on a thin-provisioned storage system, the systems and methods described herein may effectively conserve I/O bandwidth, potentially resulting in improved system performance when backing up the volume. Similarly, by restoring only those portions of a volume for which storage space has been allocated on a thin-provisioned storage system, the systems and methods described herein may potentially improve system performance during restore operations involving the volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
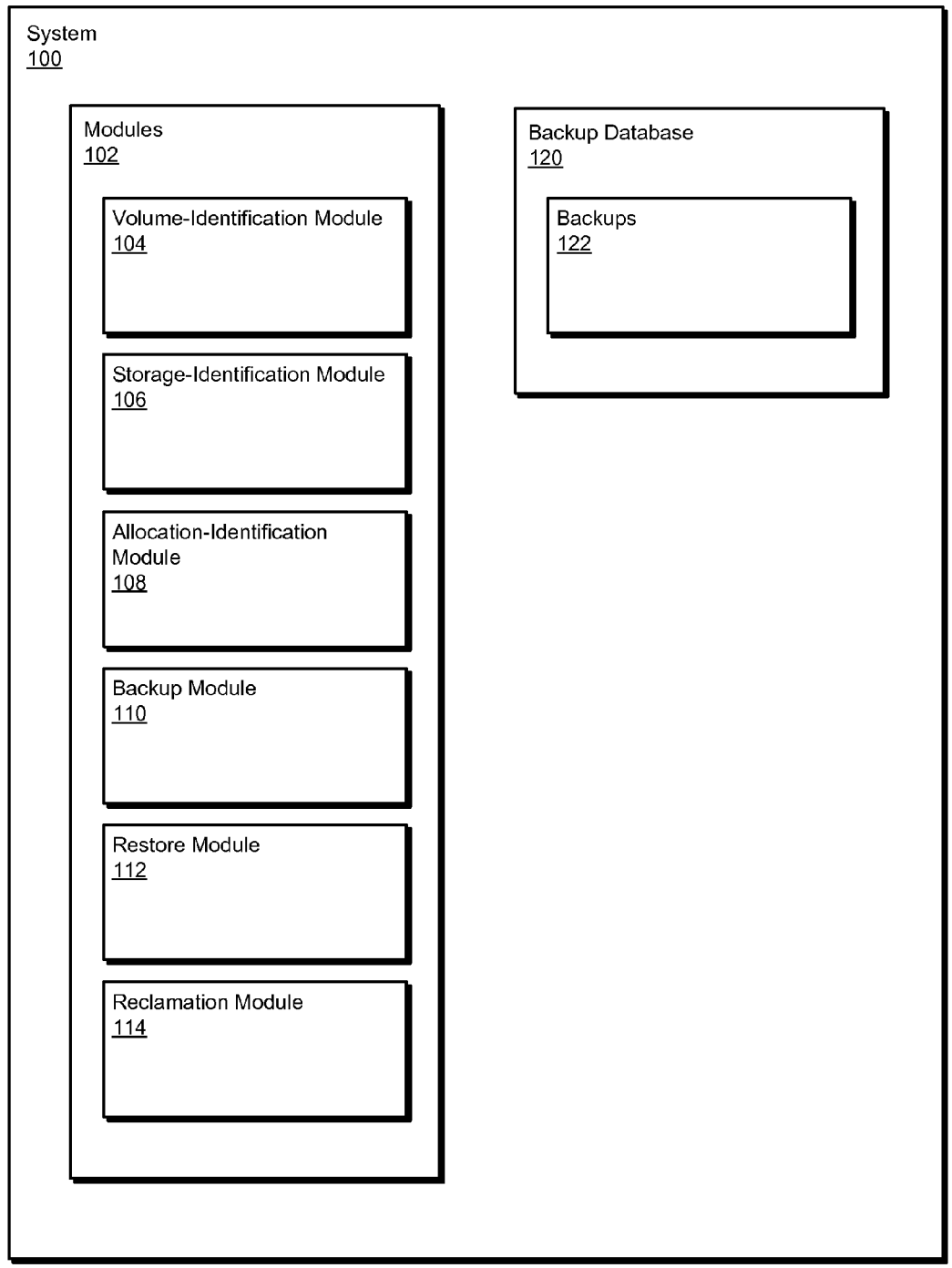
FIG. 1 is a block diagram of an exemplary system for efficiently backing up data in thin-provisioned environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for efficiently backing up data in thin-provisioned environments. The phrase "thin-provisioned storage system," as used herein, generally refers to any storage system or device (such as a disk array) capable of storing data for a computing system on an as-needed and/or just-in-time basis.

Figure 2:
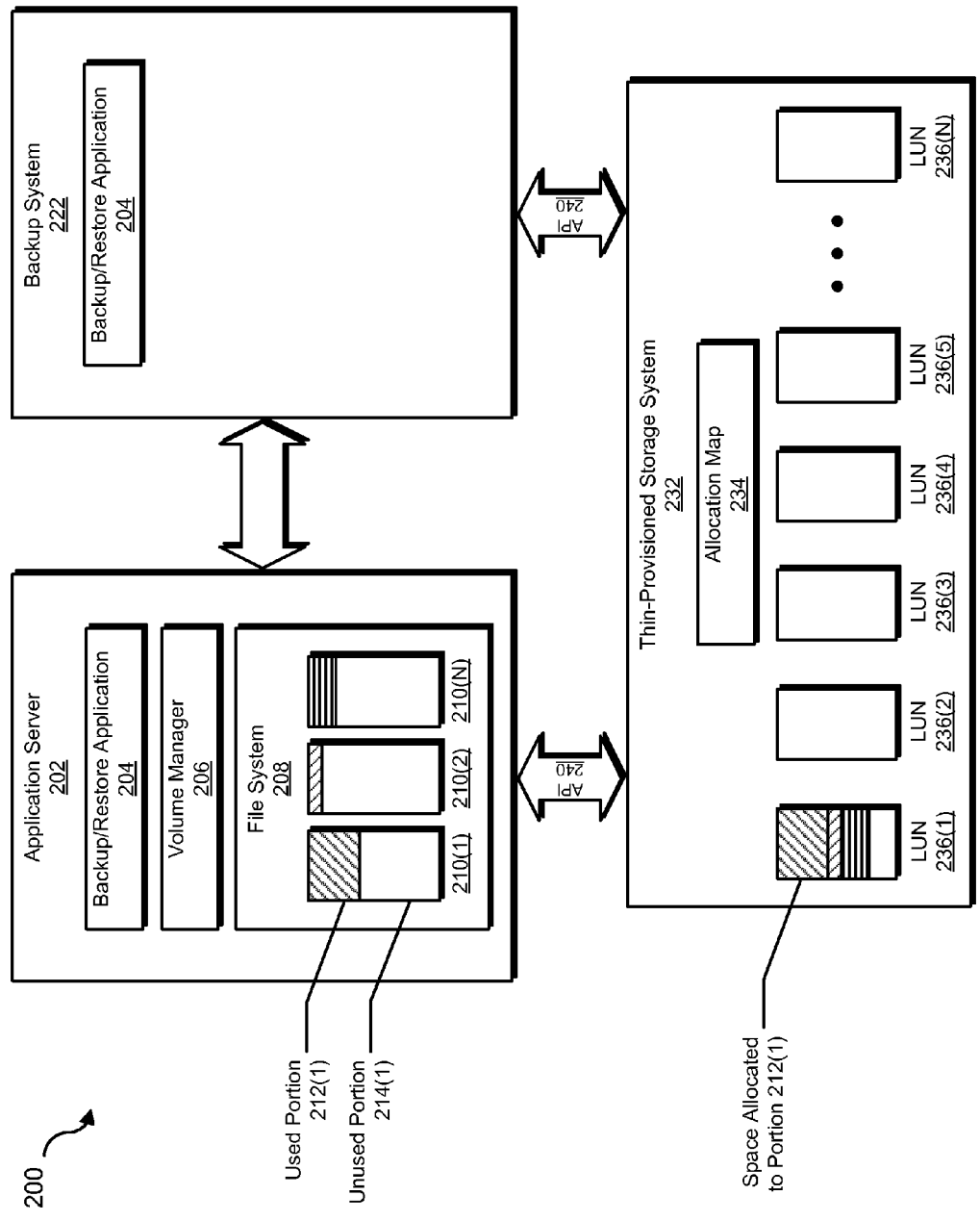
FIG. 2 is a block diagram of an exemplary system for efficiently backing up data in thin-provisioned environments.

The following will provide, with reference to FIGS. 1-2, detailed descriptions of exemplary systems for efficiently backing up data in thin-provisioned environments. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for efficiently backing up data in thin-provisioned environments. As illustrated in this figure, exemplary system 100 may include one or more modules 102 for performing one or more tasks. For example, and as will be explained in greater detail below, exemplary system 100 may include a volume-identification module 104 programmed to identify a volume to be backed up. Exemplary system 100 may also include a storage-identification module 106 programmed to identify a thin-provisioned storage system that contains storage space allocated to the volume.

In addition, and as will be described in greater detail below, exemplary system 100 may include an allocation-identification module 108 programmed to obtain information from the thin-provisioned storage system that identifies portions of the volume for which storage space has been allocated on the thin-provisioned system. Exemplary system 100 may also include a backup module 110 and restore module 112 respectively programmed to back up and restore data in thin-provisioned environments. Exemplary system 100 may also include a reclamation module 114 programmed to reclaim unallocated storage space in thin-provisioned environments. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., application server 202, backup system 222, and/or thin-provisioned storage system 232), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a backup database 120. In one embodiment, exemplary system 100 may be configured to store one or more backups 122 for thin-provisioned volumes. Backup database 120 in FIG. 1 may represent a portion of one or more computing devices. For example, backup database 120 may represent a portion of application server 202, backup system 222 and/or thin-provisioned storage system 232 in FIG. 2, computing system 610 in FIG. 6, and/or portions of exemplary network architecture 700 in FIG. 7. Alternatively, backup database 120 in FIG. 1 may represent one or more physically separate devices capable of being accessed by a computing device, such as application server 202, backup system 222, and/or thin-provisioned storage system 232 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of exemplary system 200 in FIG. 2. As shown in FIG. 2, system 200 may include an application server 202 in communication with a backup system 222 and a thin-provisioned storage system 232.

In one embodiment, and as will be described in greater detail below, application server 202 and/or backup system 222 may be programmed to: 1) identify a volume to be backed up (e.g., volume 210(1)), 2) identifying a thin-provisioned storage system that contains storage space allocated to the volume (e.g., determining that thin-provisioned storage system 232 contains storage space allocated to volume 210(1)), 3) obtaining information from the thin-provisioned storage system that identifies portions of the volume for which storage space has been allocated on the thin-provisioned storage system (e.g., obtaining an allocation map 234 from thin-provisioned storage system 232 that identifies used portions 212(1) of volume 210(1) for which storage space has been allocated on thin-provisioned storage system 232), and then 4) creating a backup of the volume by invoking read operations only for those portions of the volume for which storage space has been allocated on the thin-provisioned storage system (e.g., creating a backup of volume 210(1) by invoking read operations only for the used portions 212(1) of volume 210(1) for which storage space has been allocated on thin-provisioned storage system 232).

Application server 202 generally represents any type or form of computing device that is capable of managing data. Examples of application server 202 include, without limitation, application servers and/or database servers configured to provide various database services and/or run certain software applications.

As illustrated in FIG. 2, in some examples application server 202 may include a file system 208 containing a plurality of volumes 210(1)-210(N). In some examples, volumes 210(1)-210(N) may represent thin-provisioned volumes (i.e., logical volumes backed by storage on a thin-provisioned storage system).

Application server 202 may also include a backup/restore application 204 and/or a volume manager 206. In one example, volume manager 206 may be configured to manage one or more logical volumes. Examples of volume manager 206 include, without limitation, VERITAS VOLUME MANAGER, SOLARIS VOLUME MANAGER, or the like. As will be explained in greater detail below, in some examples backup/restore application 204 and/or volume manager 206 may include one or more of modules 102 from FIG. 1.

Similarly, backup system 222 generally represents any type or form of computing device that is capable of backing up data. In one example, backup system 222 may include backup/restore application 204, which may be configured to back up and/or restore data in thin-provisioned environments.

Thin-provisioned storage system 232 generally represents any storage system or device (such as a disk array) capable of storing data for a computing system on an as-needed and/or just-in-time basis. In one example, thin-provisioned storage system 232 may be logically divided into a plurality of logical unit numbers (LUNs) 236(1)-236(N), each of which may represent a logical reference to a physical portion of thin-provisioned storage system 232. LUNs 236(1)-236(N) may represent a disk, a section of a disk, an entire disk array, and/or or a section of a disk array within thin-provisioned storage system 232.

In some examples, application server 202 and/or backup system 222 may interface with thin-provisioned storage system 232 via an API 240. API 240 generally represents any type or form of programming interface for interfacing with a storage device, such as a thin-provisioned storage system.

In other examples, application server 202, backup system 222, and/or thin-provisioned storage system 232 may interface with one another via a network. Examples of such a network may include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like.

Figure 3:
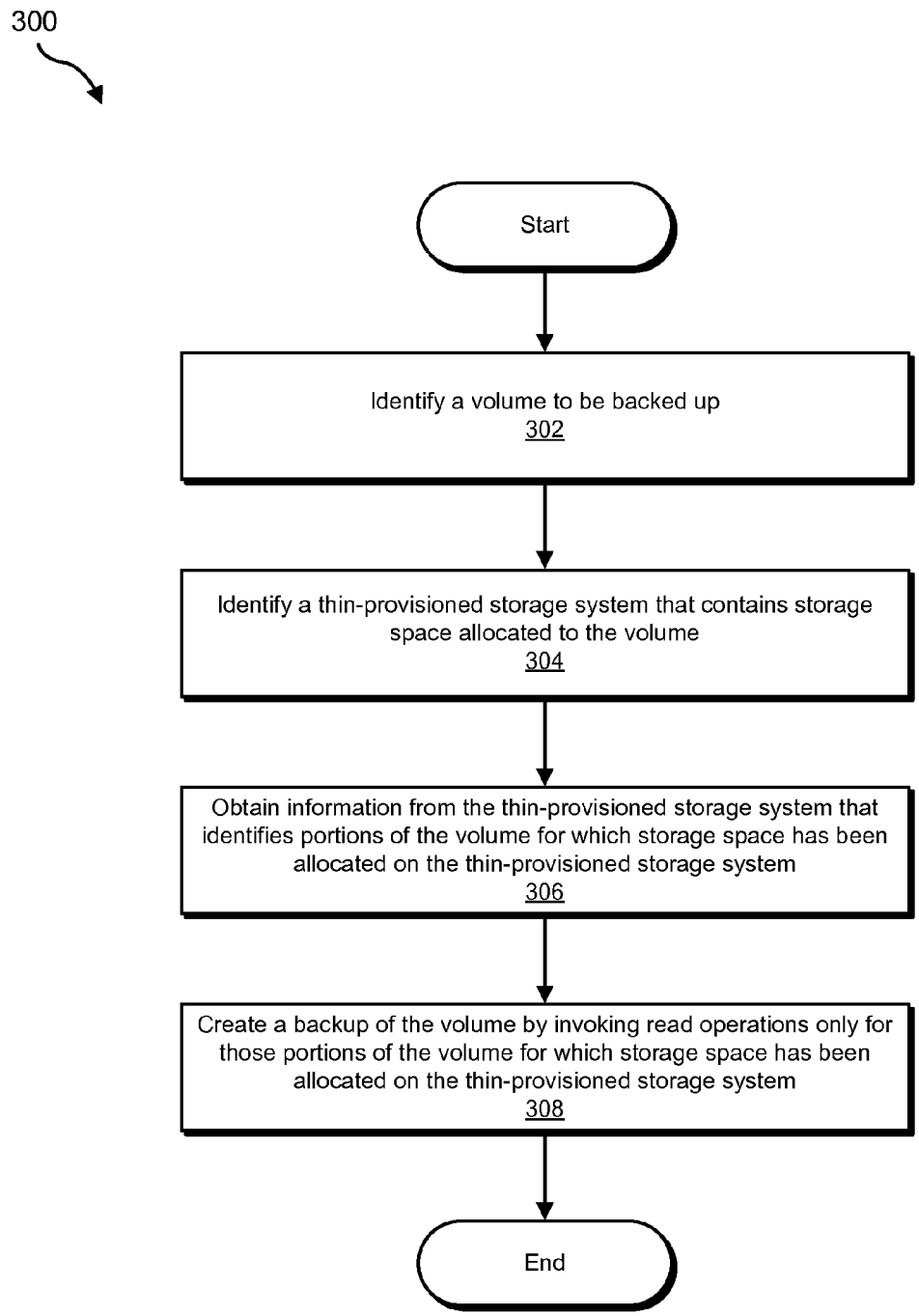
FIG. 3 is a flow diagram of an exemplary method for efficiently backing up data in thin-provisioned environments.

FIG. 3 is a flow diagram of an exemplary computer-implemented method 300 for efficiently backing up data in thin-provisioned environments. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may identify a volume to be backed up. For example, volume-identification module 104 in FIG. 1 may, as part of backup/restore application 204, volume manager 206, and/or file system 208 on application server 202 and/or backup system 222 in FIG. 2, identify a volume 210(1) to be backed up.

A "volume" may refer to a logical interface used to reference or access data stored on storage media. In addition, a "volume" may refer to a portion of a volume (such as a logical volume managed by a volume manager), an entire volume, a plurality of volumes, at least a portion of a file system (e.g., a partition within a file system), and/or any other type or form of accessible storage area. In some examples, the volume identified in step 302 may represent a thin-provisioned volume (i.e., a logical volume backed by storage on a thin-provisioned storage system, such as logical volume 210(1) backed by thin-provisioned storage system 232 in FIG. 2).

In some examples, the volume identified in step 302 may contain applications or application data managed by an application server. For example, volume 210(1) in FIG. 2 may contain applications or application data managed by application server 202.

Volume-identification module 104 in FIG. 1 may identify a volume to be backed up in step 302 in a variety of ways. In one example, volume-identification module 104 may receive a request from a user or a system administrator to back up volume 210(1) in FIG. 2. Alternatively, volume-identification module 104 may determine that volume 210(1) satisfies a time-based and/or storage-based backup policy. For example, volume-identification module 104 may determine that a used portion 212(1) of volume 210(1) exceeds a predetermined threshold. Similarly, volume-identification module 104 may determine that a period of time that has passed since the most-recent backup of volume 210(1) exceeds a predetermined threshold.

Returning to FIG. 3, at step 304 the systems described herein may identify a thin-provisioned storage system that contains storage space allocated to the volume identified in step 302. For example, storage-identification module 106 in FIG. 1 may, as a part of backup/restore application 204, volume manager 206, and/or file system 208 on application server 202 and/or backup system 222 in FIG. 2, determine that thin-provisioned storage system 232 contains storage space allocated to volume 210(1) (i.e., storage-identification module 106 may determine that thin-provisioned storage system 232 provides thin-provisioned storage space to application server 202).

Storage-identification module 106 may perform step 304 in a variety of ways. In one example, storage-identification module 106 may use a storage-mapping service (such as VERITAS MAPPING SERVICE) to identify logical unit numbers (LUNs) of a thin-provisioned storage system that contain storage space allocated to the volume identified in step 302. For example, storage-identification module 106 may, by invoking a storage-mapping service, determine that LUN 236(1) of thin-provisioned storage system 232 in FIG. 2 contains storage space allocated to volume 210(1).

In some examples, this storage-mapping service may represent a service or portion of a file system (such as file system 208), a volume manager (such as volume manager 206), and/or a backup application (such as backup/restore application 204). Alternatively, this storage-mapping service may represent a separate module (such as storage-identification module 106) that may be invoked by a file system (such as file system 208), a volume manager (such as volume manager 206), and/or a backup application (such as backup/restore application 204).

Returning to FIG. 3, at step 306 the systems described herein may obtain information from the thin-provisioned storage system that identifies portions of the volume for which storage space has been allocated on the thin-provisioned storage system. For example, allocation-identification module 108 in FIG. 1 may, as part of backup/restore application 204, volume manager 206, and/or file system 208 on application server 202 and/or backup system 222, obtain information from thin-provisioned storage system 232 that identifies portions (e.g., used portion 212(1)) of volume 210(1) for which storage space has been allocated on thin-provisioned storage system 232 (e.g., LUN 236(1)).

Allocation-identification module 108 may obtain this information in step 306 in a variety of ways. In one example, allocation-identification module 108 may obtain this information: 1) via a file system associated with the volume (e.g., via file system 208), 2) via a volume manager associated with the volume (e.g., via volume manager 206), and/or directly from the thin-provisioned storage system (e.g., directly from thin-provisioned storage system 232). For example, allocation-identification module 108 may, as part of backup/restore application 204 on application server 202 and/or backup system 222 in FIG. 2, may obtain this information by querying file system 208, querying volume manager 206, and/or by directly querying thin-provisioned storage system 232.

In one example, allocation-identification module 108 may obtain the information in step 306 via an API associated with the thin-provisioned storage system. For example, allocation-identification module 108 may, as part of backup/restore application 204 on application server 202 and/or backup system 222, obtain this information by directly querying thin-provisioned storage system 232 using API 240, by querying volume manager 206 (which may in turn query thin-provisioned storage system 232 using API 240), and/or by querying file system 208 (which may in turn query thin-provisioned storage system 232 using API 240).

In some examples, the information obtained in step 306 may represent an allocation map that that identifies: 1) portions of the volume for which storage space has been allocated on the thin-provisioned storage system (i.e., allocated portions of the volume), 2) portions of the volume for which storage space has not been allocated on the thin-provisioned storage system (i.e., unallocated portions), and/or 3) the location of the storage space on the thin-provisioned storage system that has been allocated to the volume. For example, allocation-identification module 108 may, as part of backup/restore application 204 on application server 202 and/or backup system 222, obtain an allocation map 234 from thin-provisioned storage system 232 in FIG. 2. In this example, allocation map 234 may indicate that thin-provisioned storage system 232 has allocated storage space for a used portion of 212(1) of volume 210(1) but has not allocated storage space to an unused portion 214(1) of volume 210(1). In some examples, allocation map 234 may also identify the location of the storage space on thin-provisioned storage system 232 that has been allocated to the used portion 212(1) of volume 210(1) (e.g., the location of the storage space on LUN 236(1) that has been allocated to the used portion 212(1) of volume 210(1)).

Returning to FIG. 3, at step 308 the systems described herein may create a backup of the volume by invoking read operations only for those portions of the volume for which storage space has been allocated on the thin-provisioned storage system. For example, backup module 110 in FIG. 1 may, as part of backup/restore application 204 on application server 202 and/or backup system 222 in FIG. 2, create a backup of volume 210(1) by invoking read operations only for the used portion 212(1) of volume 210(1) since, as detailed above, thin-provisioned storage system 232 may have only allocated storage space for used portion 212(1) of volume 210(1).

Backup module 110 may perform step 308 in a variety of ways. In one example, backup module 110 may invoke read operations via a file system associated with the volume, via a volume manager associated with the volume, or directly on the thin-provisioned storage system. For example, backup/restore application 204 may, when backing up volume 210(1) from file system 208 and/or volume manager 206, read only used portion 212(1) of volume 210(1) from file system 208 and/or volume manager 206 since allocation map 234 indicates that thin-provisioned storage system 232 has not allocated storage space to unused portion 214(1) of volume 210(1). Similarly, backup/restore application 204 may, when backing up volume 210(1) directly from thin-provisioned storage system 232, request that thin-provisioned storage system 232 provide only the stored data that corresponds to the used portion 212(1) of volume 210(1) since, as detailed above, allocation map 234 indicates that thin-provisioned storage system 232 has not allocated storage space to unused portion 214(1) of volume 210(1).

Figure 4:
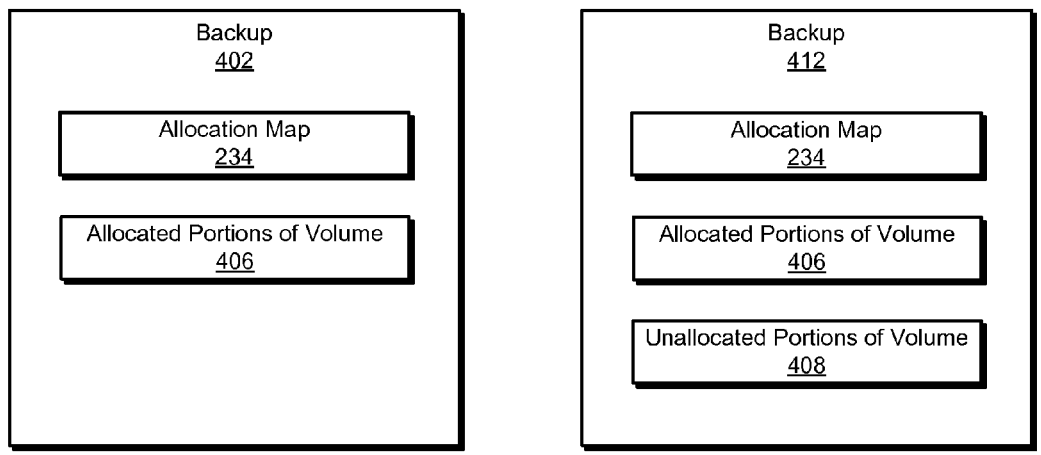
FIG. 4 is an illustration of exemplary backups of a thin-provisioned volume.

Backup module 110 may create the backup for the volume in step 308 in a variety of ways. In one example, backup module 110 may create the backup for the volume by storing, within the backup of the volume: 1) those portions of the volume for which storage space has been allocated on the thin-provisioned storage system and 2) the allocation map obtained from the thin-provisioned storage system. For example, as illustrated in FIG. 4, backup module 110 in FIG. 1 may, as part of backup/restore application 204 in FIG. 2, create a backup 402 for volume 210(1) in FIG. 1 that contains allocation map 234 (obtained, as detailed above, from thin-provisioned storage system 232 in step 306) and allocated portions 406 of volume 210(1) (i.e., data obtained from thin-provisioned storage system 232 that corresponds to the used portion 212(1) of volume 210(1)). In this example, backup 402 may not include data that corresponds to the unallocated portions of volume 210(1) (e.g., data that corresponds to unused portion 214(1) of volume 210(1) since, in this example, unused portion 214(1) may be empty or merely contain zeros).

In an additional example, backup module 110 may create a backup 412 of volume 210(1) that contains: 1) allocation map 234, 2) the allocated portions 406 of volume 210(1), and 3) unallocated portions 408 of volume 210(1). Since, as detailed above, backup module 110 may not invoke read operations for portions of volume 210(1) for which storage space has not been allocated on thin-provisioned storage system 232, in some examples backup module 110 may re-create unused portion 214(1) of volume 210(1) by writing zeros within backup 412 in place of the unused portion 214(1) of volume 210(1) (as represented by unallocated portions 408 of volume 210(1)). Upon creating a backup for the volume in step 308, exemplary method 300 in FIG. 3 may terminate.

As detailed above, by invoking read operations only for those portions of a volume for which storage space has been allocated on a thin-provisioned storage system, the systems and methods described herein may effectively conserve I/O bandwidth, potentially resulting in improved system performance when backing up the volume.

Figure 5:
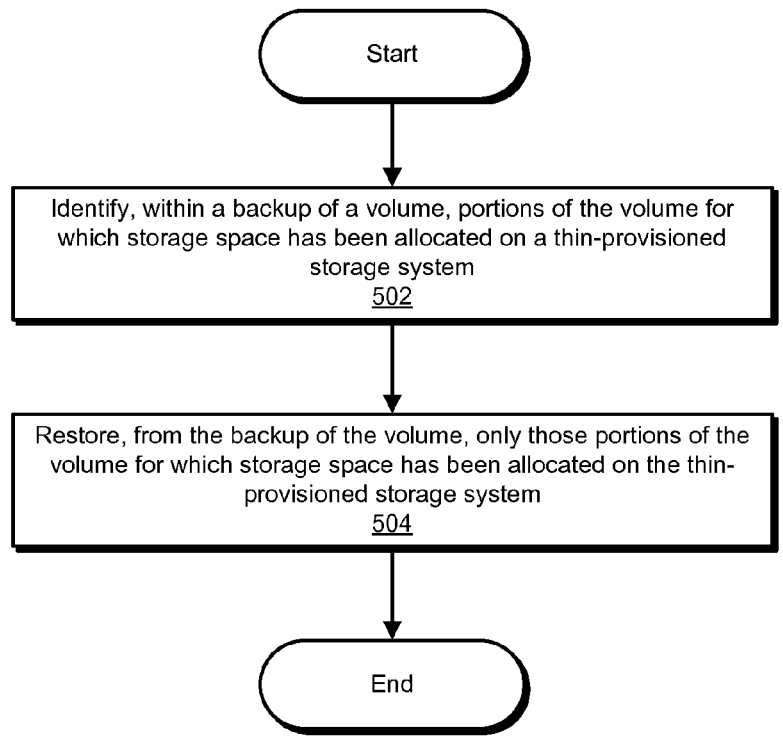
FIG. 5 is a flow diagram of an exemplary method for effectively restoring data in thin-provisioned environments.

As detailed above, the systems and methods described herein may also be used to restore backups of thin-provisioned volumes. FIG. 5 is a flow diagram of an exemplary method 500 for performing such a task. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 the systems described herein may identify, within a backup of a volume, portions of the volume for which storage space has been allocated on a thin-provisioned storage system. For example, restore module 112 in FIG. 1 may, as part of backup/restore application 204 on application server 202 and/or backup system 222, identify, within backup 402 or 412 in FIG. 4, allocated portions 406 of volume 210(1) (which allocated portions may contain, as detailed above, data obtained from thin-provisioned storage system 232 that corresponds to the used portion 212(1) of volume 210(1)).

Returning to FIG. 5, at step 504 the systems described herein may restore, from the backup of the volume, only those portions of the volume for which storage space has been allocated on the thin-provisioned storage system. For example, restore module 112 in FIG. 1 may, as part of backup/restore application 204 on application server 202 and/or backup system 222 in FIG. 2, restore only allocated portions 406 from backup 402 or backup 412 in FIG. 4, as opposed to restoring both allocated portions 406 and unallocated portions 408.

In some examples, restore module 112 may restore the volume in step 504 to a thin-provisioned storage system. In other examples, restore module 112 may restore the volume in step 504 to a non-thin-provisioned storage system (i.e., a "fat" storage system). In either example, restore module 112 may only restore those portions of the volume for which storage space has been allocated within a thin-provisioned environment.

If restore module 112 is restoring a backup to a non-thin-provisioned storage system, then, in some examples, restore module 112 may: 1) identify, within the backup of the volume, portions of the volume for which storage space has not been allocated within a thin-provisioned environment and then 2) write zeros on the non-thin-provisioned storage system in place of the portions of the volume for which storage space has not been allocated within the thin-provisioned environment. For example, restore module 112 may, upon restoring allocated portions 406 from backup 402 or backup 412 to a fat storage system, instruct the fat storage system to write zeros within regions of data on the fat storage system that correspond to unallocated portions 408 within backup 412. Upon completion of step 504, exemplary method 500 in FIG. 5 may terminate.

In some examples, the systems described herein may, upon restoring the volume in step 504 in exemplary method 500 in FIG. 5, reclaim unallocated storage space on the storage system. For example, reclamation module 114 in FIG. 1 may, by invoking a reclamation API, cause the thin or fat storage system to which the data was restored in step 504 to reclaim unallocated storage space. In the case of a thin-provisioned storage system, reclamation module 114 may instruct the thin-provisioned storage system to reclaim storage space allocated on the thin-provisioned storage system prior to performance of the restore operation in step 504 in FIG. 5. Similarly, in the case of a fat storage system, reclamation module 114 may instruct the fat storage system to reclaim unused storage space (e.g., storage space that corresponds to an unused portion of a volume, such as unused portion 214(1) of volume 210(1) in FIG. 2).

As detailed above, by restoring only those portions of a volume for which storage space has been allocated on a thin-provisioned storage system, the systems and methods described herein may potentially improve system performance during restore operations involving the volume.

Figure 6:
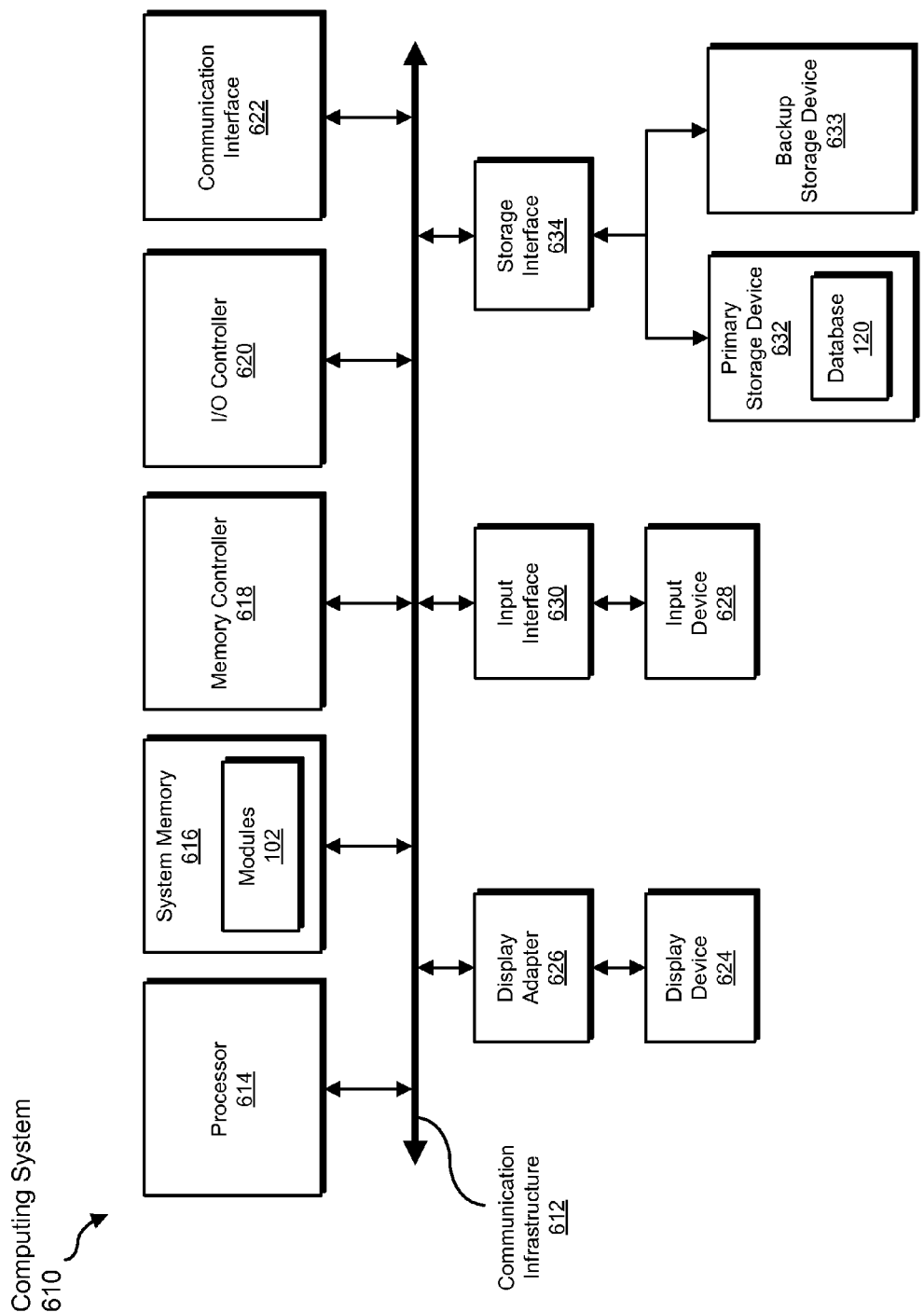
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, obtaining, creating, using, invoking, reading, storing, writing, restoring, and reclaiming steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, obtaining, creating, using, invoking, reading, storing, writing, restoring, and reclaiming.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, obtaining, creating, using, invoking, reading, storing, writing, restoring, and reclaiming steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, obtaining, creating, using, invoking, reading, storing, writing, restoring, and reclaiming steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, obtaining, creating, using, invoking, reading, storing, writing, restoring, and reclaiming steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, backup database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, obtaining, creating, using, invoking, reading, storing, writing, restoring, and reclaiming steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
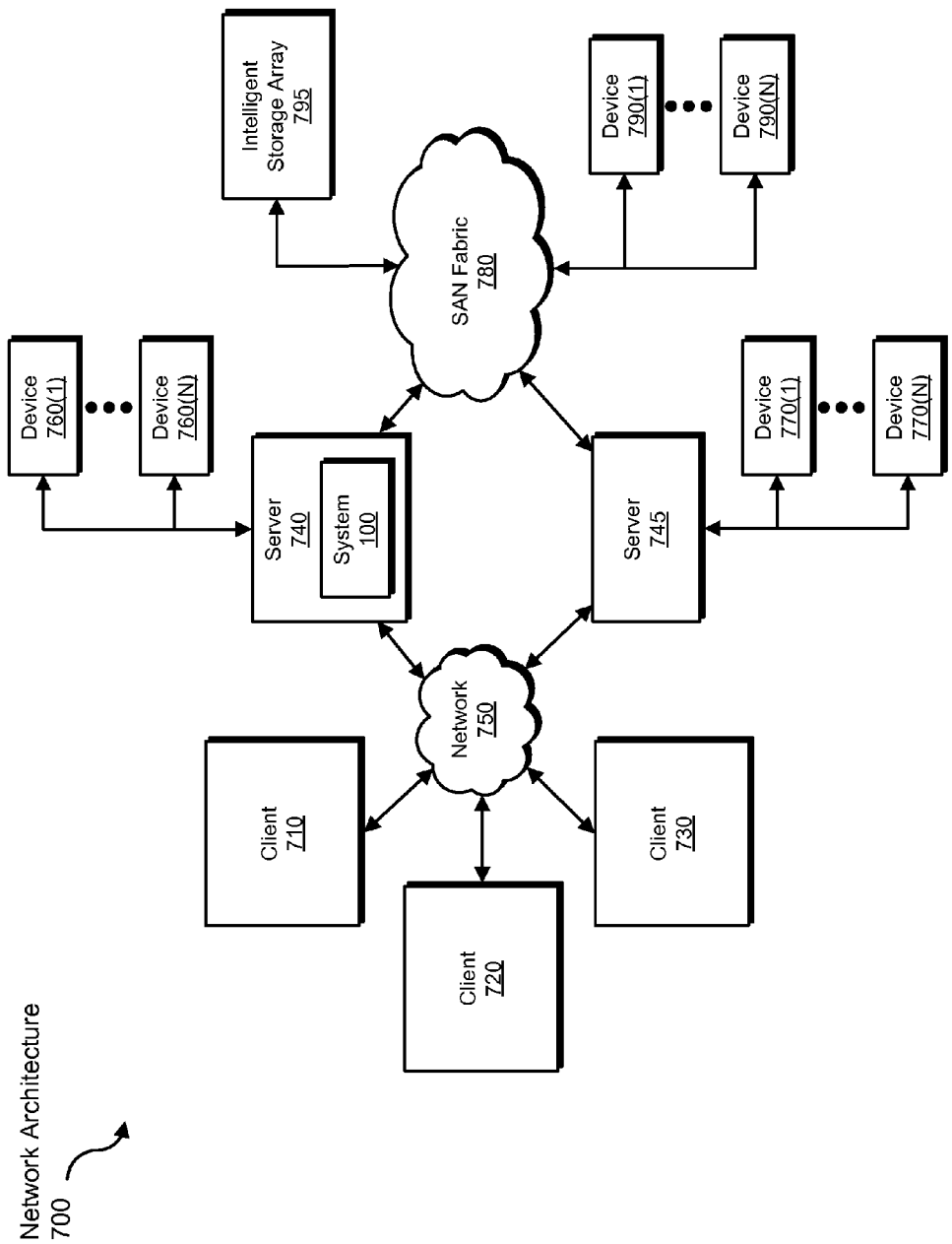
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, obtaining, creating, using, invoking, reading, storing, writing, restoring, and reclaiming steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for efficiently backing up and/or restoring data within a thin-provisioned environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In one example, all or a portion of the exemplary systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the modules described herein may transform data, physical devices, and/or representations of physical devices from one form to another. For example, backup module 110 and/or restore module 112 in FIG. 1 may modify a characteristic or property of application server 202 and/or thin-provisioned storage system 232 in FIG. 2 by backing up data from, or restoring data to, application server 202 and/or thin-provisioned storage system 232.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficiently backing up data in thin-provisioned environments, at least a portion of the method being performed by a computing device comprising at least one processor, the method comprising:
   identifying a volume to be backed up;
   identifying a thin-provisioned storage system that contains storage space allocated to the volume;
   obtaining information from the thin-provisioned storage system that identifies portions of the volume for which storage space has been allocated on the thin-provisioned storage system;
   creating a backup of the volume by:
      invoking read operations only for the portions of the volume for which storage space has been allocated on the thin-provisioned storage system;
      storing, within the backup of the volume, the portions of the volume for which storage space has been allocated on the thin-provisioned storage system;
      writing zeros within the backup of the volume in place of portions of the volume for which storage space has not been allocated on the thin-provisioned storage system; after creating the backup of the volume, restoring the volume by:
   identifying, within the backup of the volume, the portions of the volume for which storage space has been allocated on the thin-provisioned storage system;
   restoring, from the backup of the volume, only those portions of the volume for which storage space has been allocated on the thin-provisioned storage system to a target thin-provisioned storage system;
   invoking, after restoring only those portions of the volume for which storage space has been allocated on the thin-provisioned storage system, a reclamation application programming interface to reclaim unallocated storage space that, prior to restoring only those portions of the volume for which storage space has been allocated on the thin-provisioned storage system, was allocated on the target thin-provisioned storage system.

2. The method of claim 1, wherein obtaining information from the thin-provisioned storage system that identifies portions of the volume for which storage space has been allocated on the thin-provisioned storage system further comprises directly querying the thin-provisioned storage system using an application programming interface that provides an interface for interfacing with the thin-provisioned storage system.

3. The method of claim 1, wherein obtaining information from the thin-provisioned storage system that identifies portions of the volume for which storage space has been allocated on the thin-provisioned storage system further comprises:
   issuing a first query to a volume manager that is contained within an application server and that is configured to manage a plurality of volumes that includes the volume;
   issuing a second query, by the volume manager in response to the first query, to the thin-provisioned storage system using an application programming interface that provides an interface for interfacing with the thin-provisioned storage system.

4. The method of claim 1, wherein obtaining information from the thin-provisioned storage system that identifies portions of the volume for which storage space has been allocated on the thin-provisioned storage system further comprises:
   issuing a first query to a file system that is contained within an application server and that contains a plurality of volumes that includes the volume;
   issuing a second query, by the file system in response to the first query, to the thin-provisioned storage system using an application programming interface that provides an interface for interfacing with the thin-provisioned storage system.

5. The method of claim 1, wherein the volume contains applications managed by an application server.

6. The method of claim 1, wherein the volume contains application data managed by an application server.

7. The method of claim 1, wherein the thin-provisioned storage system is logically divided into a plurality of logical unit numbers that each represent a logical reference to a physical disk.

8. The method of claim 1, wherein:
obtaining the information from the thin-provisioned storage system comprises obtaining an allocation map from the thin-provisioned storage system that identifies at least one of:
the portions of the volume for which storage space has been allocated on the thin-provisioned storage system;
the portions of the volume for which storage space has not been allocated on the thin-provisioned storage system;
the location of the storage space on the thin-provisioned storage system that has been allocated to the volume;
creating the backup of the volume comprises storing, within the backup of the volume, the allocation map.

9. The method of claim 7, wherein identifying the thin-provisioned storage system comprises using a storage-mapping service to identify logical unit numbers of the thin-provisioned storage system that contain storage space allocated to the volume.

10. The method of claim 1, wherein identifying the volume to be backed up comprises receiving a request from a system administrator to back up the volume.

11. The method of claim 1, wherein identifying the volume to be backed up comprises receiving a request from a user to back up the volume.

12. The method of claim 1, wherein the volume comprises at least one of:
an entire volume;
a plurality of volumes;
at least a portion of a file system.

13. A system for efficiently backing up data in thin-provisioned environments, the system comprising:
a volume-identification module programmed to identify a volume to be backed up;
a storage-identification module programmed to identify a thin-provisioned storage system that contains storage space allocated to the volume;
an allocation-identification module programmed to obtain information from the thin-provisioned storage system that identifies portions of the volume for which storage space has been allocated on the thin-provisioned storage system;
a backup module programmed to create a backup of the volume by:
invoking read operations only for the portions of the volume for which storage space has been allocated on the thin-provisioned storage system;
storing, within the backup of the volume, the portions of the volume for which storage space has been allocated on the thin-provisioned storage system;
writing zeros within the backup of the volume in place of portions of the volume for which storage space has not been allocated on the thin-provisioned storage system;
a restore module programmed to restore, after creating the backup of the volume, the volume by:
identifying, within the backup of the volume, the portions of the volume for which storage space has been allocated on the thin-provisioned storage system;
restoring, from the backup of the volume, only those portions of the volume for which storage space has been allocated on the thin-provisioned storage system to a target thin-provisioned storage system;
invoking, after restoring only those portions of the volume for which storage space has been allocated on the thin-provisioned storage system, a reclamation application programming interface to reclaim unallocated storage space that, prior to restoring only those portions of the volume for which storage space has been allocated on the thin-provisioned storage system, was allocated on the target thin-provisioned storage system;
at least one processor configured to execute the volume-identification module, the storage-identification module, the allocation-identification module, the backup module, and the restore module.

14. The system of claim 13, wherein the thin-provisioned storage system is logically divided into a plurality of logical unit numbers that each represent a logical reference to a physical disk.

15. The system of claim 13, wherein the backup module invokes read operations only for the portions of the volume for which storage space has been allocated on the thin-provisioned storage system by reading only the portions of the volume for which storage space has been allocated on the thin-provisioned storage system from at least one of:
a file system associated with the volume;
a volume manager associated with the volume;
the thin-provisioned storage system.

16. The system of claim 13, wherein the backup module creates the backup of the volume by storing, within the backup of the volume, an allocation map that identifies at least one of:
the portions of the volume for which storage space has been allocated on the thin-provisioned storage system;
the portions of the volume for which storage space has not been allocated on the thin-provisioned storage system;
the location of the storage space on the thin-provisioned storage system that has been allocated to the volume.

17. The system of claim 13, wherein the allocation-identification module obtains the information from the thin-provisioned storage system that identifies portions of the volume for which storage space has been allocated on the thin-provisioned storage system at least in part by directly querying the thin-provisioned storage system using an application programming interface that provides an interface for interfacing with the thin-provisioned storage system.

18. A non-transitory computer-readable medium containing computer-readable instructions that, when executed by at least one processor of a computing device, cause the computing device to:
identify a volume to be backed up;
identify a thin-provisioned storage system that contains storage space allocated to the volume;
obtain information from the thin-provisioned storage system that identifies portions of the volume for which storage space has been allocated on the thin-provisioned storage system;
create a backup of the volume by:
invoking read operations only for the portions of the volume for which storage space has been allocated on the thin-provisioned storage system;
storing, within the backup of the volume, the portions of the volume for which storage space has been allocated on the thin-provisioned storage system;

writing zeros within the backup of the volume in place of portions of the volume for which storage space has not been allocated on the thin-provisioned storage system; after creating the backup of the volume, restore the volume by:

identifying, within the backup of the volume, the portions of the volume for which storage space has been allocated on the thin-provisioned storage system;

restoring, from the backup of the volume, only those portions of the volume for which storage space has been allocated on the thin-provisioned storage system to a target thin-provisioned storage system;

invoking, after restoring only those portions of the volume for which storage space has been allocated on the thin-provisioned storage system, a reclamation application programming interface to reclaim unallocated storage space that, prior to restoring only those portions of the volume for which storage space has been allocated on the thin-provisioned storage system, was allocated on the target thin-provisioned storage system.

\* \* \* \* \*